United States Patent
Quichaud et al.

[11] 3,714,831
[45] Feb. 6, 1973

[54] DEVICE FOR SUSPENDING MEASURING INSTRUMENTS INSIDE DRILLING ASSEMBLY

[75] Inventors: Claude Quichaud, Billere; Jean-Pierre Le Peuvedic; Jacques Tinchon, both of Pau, all of France

[73] Assignee: Societe Nationale des Petroles d'Aquitaine, Paris, France

[22] Filed: Sept. 3, 1970

[21] Appl. No.: 69,235

[30] Foreign Application Priority Data

Sept. 5, 1969 France..................................6930325

[52] U.S. Cl..................73/431, 175/40, 248/358 R, 287/85 R
[51] Int. Cl...........................G01d 11/10, G01l 19/14
[58] Field of Search................73/431, 430, 151, 152; 248/358 R; 287/85 R; 1/151; 175/40

[56] References Cited

UNITED STATES PATENTS

| | | | |
|---|---|---|---|
| 3,149,490 | 9/1964 | Clements et al. | 73/151 |
| 3,158,923 | 12/1964 | Reinsma | 287/85 R |
| 2,295,829 | 9/1942 | Carlson | 248/358 R |
| 3,387,839 | 6/1968 | Miller et al. | 287/85 R X |
| 2,577,599 | 12/1951 | Bethancourt | 73/431 X |
| 2,795,398 | 6/1957 | Ragland | 287/85 R |

*Primary Examiner*—Louis R. Prince
*Assistant Examiner*—Daniel W. Yasich
*Attorney*—Holcombe, Wetherill & Brisebois

[57] ABSTRACT

A device for suspending a measuring instrument in a drilling assembly comprising: a drill-collar designed to receive the measuring instrument; at least one connecting member attached to the measuring instrument and provided with a shoulder; a number of suspension rings consisting of three sections integrated by vulcanization i.e., a first frame, a second frame having the same center line and an annular elastomeric body between said frame, said suspension rings bearing by one of their frames on said shoulder; a first permanent seat on the connecting member through which said rings are attached to the connecting member; a second permanent seat on the drill-collar bearing on the other frame of said suspension rings and an annular part supported between said seats and made of an elastomer having a greater rigidity than that of the elastomer used to make the suspension rings.

10 Claims, 5 Drawing Figures

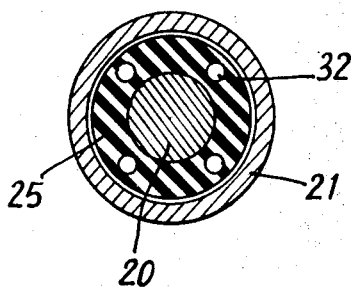
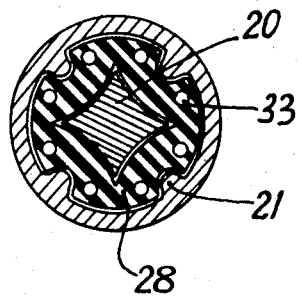
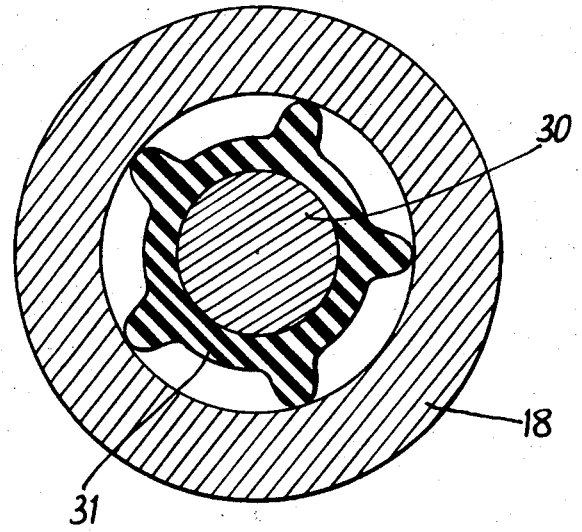

DEVICE FOR SUSPENDING MEASURING INSTRUMENTS INSIDE DRILLING ASSEMBLY

The subject of the present invention is a device for suspending measuring instruments inside a drilling assembly.

It is known that measuring instruments placed inside drill-pipes are subjected to great vibrations due to the vibrations caused by the tool, the rotation of the drilling assembly and the shocks of various origins propagated in said assembly.

The measuring devices consist of detectors followed by electronic units designed to convert the signals delivered by the detector into mechanical or hydraulic pulses imparted to the drilling rods or to the drilling mud.

The geometrical characteristic of these measuring instruments is their small diameter so that they can fit inside the drilling string while still leaving a large free space so as to avoid causing excessive load losses.

This leads to suspension difficulties because these instruments, while being carried by the drilling assembly, should not be subjected to its vibrations.

At present, the measuring instruments are rigidly fitted inside drill collars which constitute the lower part of the drilling assembly. The drill collars used comprise shoulders upon which the bearing components of the measuring instruments rest, and which are very sturdy in order to overcome these difficulties.

On the contrary, the present invention ensures elastic suspension with controlled rigidity, enabling the measuring device to move inside the drilling assembly, while at the same time limiting these movements.

One feature of the suspension device, which is the subject of the present invention and which comprises at least one connecting member having a shoulder and fixing itself onto the measuring instrument, is a large number of suspension rings, each consisting of three sections integrated by vulcanization, i.e., a first frame, an annular body of elastomer, and a second frame having the same center-line as the first, said rings being supported on each connecting member by a seat attached to the connecting member, a second seat fixed to the drilling collar designed to receive the measuring instrument and bearing on the other frame of said suspension rings, and an additional elastomeric ring between said seats having a rigidity greater than that of the elastomer used to make the suspension rings.

An object of the invention is to provide the rings over a certain length with a central recess communicating with the outside through suitable apertures.

Another object of the invention is to provide the elastomeric parts of the suspension rings with a series of recesses the number and diameter of which depend on the rigidity of the ring.

A further object of the invention is to provide a centering ring inside which a guiding connection, attached to the measuring instrument, can slide.

A still further object of the invention is to provide the frames of the elastomer forming the suspension rings with grooves parallel to the center-line of the rings.

For the understanding of the principle of the invention, reference is made to the following description of typical embodiments thereof as illustrated in the accompanying drawings.

In the drawings:

FIGS. 3, 4 and 5 are sectional views at different levels of the suspension rings shown in FIG. 2.

FIG. 1 shows the section of a drill-collar designed to be placed in the lower part of a drilling assembly, not far from the drill bit and equipped with a measuring instrument suspension device.

Figure 1:
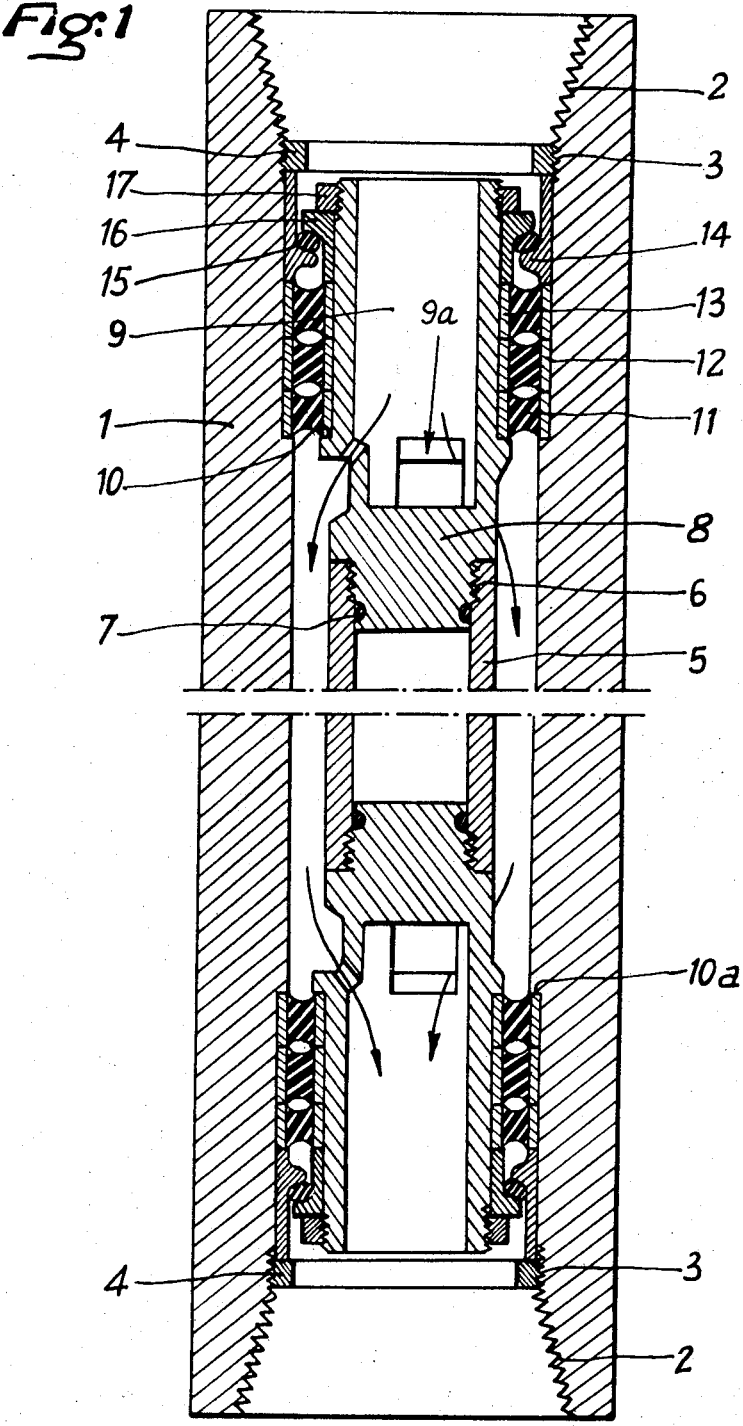
FIG. 1 is an elevational view of a symmetrical suspension device.

The drill-collar 1 has, at its ends, conical female threads 2 which enable it to be in the drilling assembly.

These threads are followed by a fine thread 3 which is designed to receive a bushing 4.

The measuring instrument 5 has at each end a thread 6 followed by a groove fitted with an O-ring seal. Plug 8 is screwed onto the thread 6 of the measuring instrument. This plug has in one part of its length a central recess 9 which is connected to apertures 9a which allow the stream of mud to pass around the measuring instrument. This plug 8 has a shoulder 10 while the drill collar also has a shoulder 10a at nearly the same height.

On these shoulders are placed the rings 11, each comprising two concentric frames embracing an elastomer insert. The external frame 12 is integrated to the elastomer by vulcanization and the same applies to the internal frame 13. A number of rings sufficient to provide the required suspension are thus placed around the plug.

External frames 12 are contiguous and bear on a seat 14 which is located by bushing 3. An annular elastomeric member 15 is fixed to seat 14. Similarly, internal frame 13 bears on a seat 16 which is held on plug 8 by a screw collar 17.

The parts should be assembled as follows: The measuring instrument 5 fitted with two plugs 8 is positioned inside drill-collar 1. A sufficient number of suspension rings 11 are introduced into the remaining annular space. The seat 14 with its resilient ring 15 is inserted inside the drill-collar. Seat 14 is tightened by bushing 4. Seat 16 is then slipped onto plug 8 and fixed with the screw collar 17. The assembly is then ready to operate.

One can consider the vibrations to which the drilling assembly is subjected as belonging to three types: longitudinal, radial, torsional. The elastomeric rings absorb these three types of vibrations.

In particular, the high amplitude longitudinal vibrations are absorbed. In a first stage, the distortion of the rings permits movement of the measuring instrument, a movement which is braked by the absorber ring 15 on seat 14. This braking is progressive by distortion of the ring, the rigidity of which is greater than that of the suspension rings 11. The maximum amplitude of the travel is adjusted by the play between seats 14 and 16.

One uses, as absorber elastomers, for temperatures lower than about a hundred degrees centigrade, elastomers of the nitrile acrylic type, and fluorinated elastomers for the higher temperatures.

The suspension rings can be provided with recesses in the part consisting of the elastomer.

Figure 2:
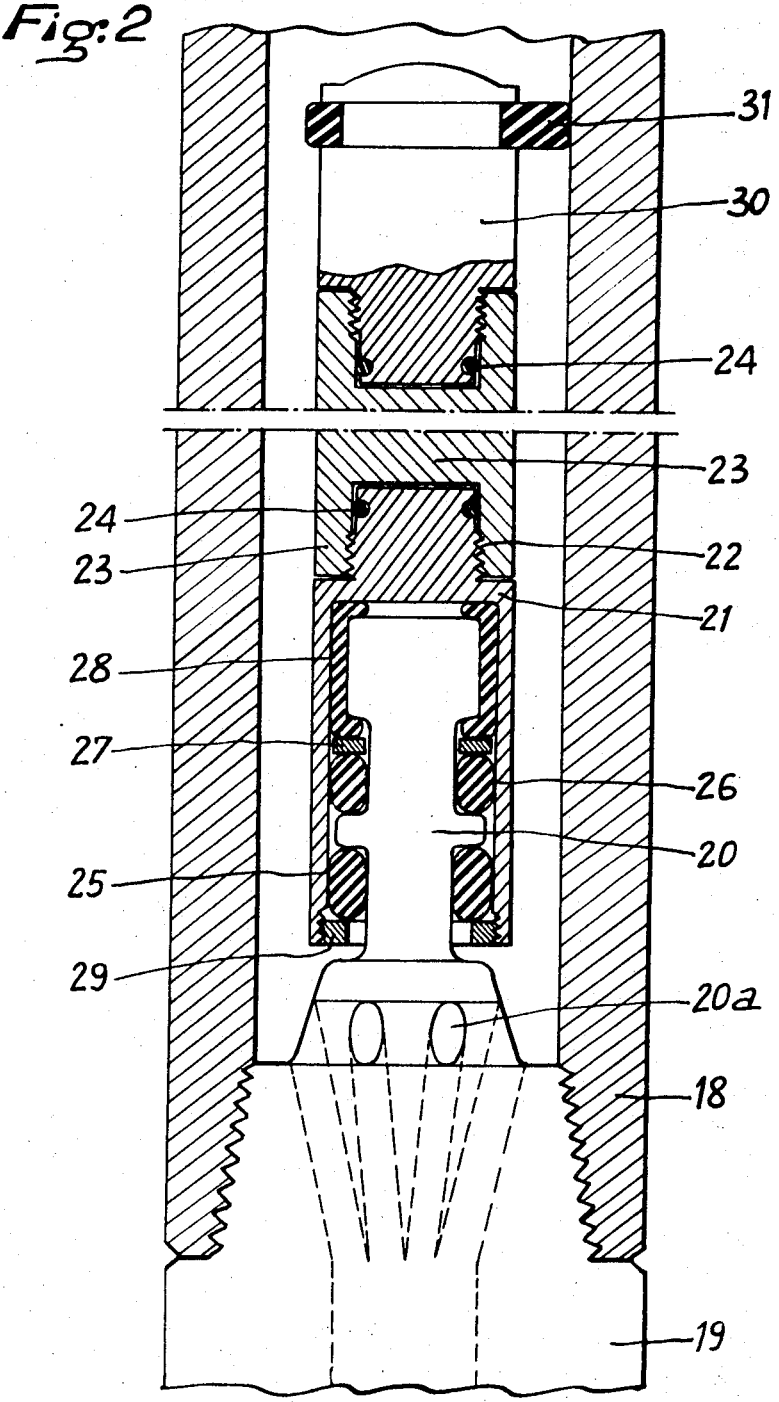
FIG. 2 is an elevational view of an asymmetrical suspension device.

FIG. 2 shows another manner of constructing the device in accordance with the present invention.

A special drill-collar 18 is connected to a second drill-collar 19 carrying a central axial projection 20 connected to the collar 19 by a web comprising orifices 20a for the passage of the drilling mud. Part 20 carries a connection 21 fixed by a fine thread 22 to the measuring instrument 23, with the interpolation of an O- ring seal 24. The space between 20 and 21 is filled with suspension rings 25, 26, 28, the latter two being separated by a metal collar 27. The shape of part 20 and of connecting member 21 together with the shape of the suspension rings 25, 26 and 28 will be described in FIGS. 3, 4 and 5.

A locking ring 29, screwed into the connecting member 21, holds the suspension rings in their place.

A connecting member 30 carrying a suspension or centering ring 31 is attached to the other end of the measuring instrument.

FIG. 3 is a cross-section at the level of suspension ring 25. The male part 20 is cylindrical, and this also applies to the connection 21 and to the ring 25, provided with holes or recesses 32.

FIG. 4 is another cross-section at the level of the suspension ring 28. Part 20 is cross-shaped. Connecting member 21 is provided internally with ribs parallel with its center-line and ring 28 fits into the space between these two parts. It is provided with a number of holes or recesses 33.

FIG. 5 is a third cross-section at the level of the ring 31.

Connection 30 and drill-collar 18 can be seen. Between them is fitted a centering ring 31, the internal surface of which is cylindrical and the external surface of which is provided with ribs leaving between it and the internal wall of drill-collar 18 a free space for the passing of the stream of mud.

This device should be assembled as follows: The screw ring 29, annular elastomeric suspension rings 25 and 26, then the metal ring 27 and finally ring 28 are successively positioned on the male part 20. Connector number 21 is slid onto this assembly after it has been screwed onto the measuring instrument 23. Finally, ring 29 is screwed onto connecting member 21, leaving the necessary play.

Connection 30, first fitted with elastomeric centering ring 31, is attached to the measuring instrument. Then the special drill-collar is placed on the assembly and connected to drill-collar 19.

The longitudinal vibrations are damped by ring 26. The torsion vibrations are damped by the cross-shaped ring 28.

The radial vibrations cannot be transmitted through ring 31.

Ring 25, which is more rigid, is used to limit the motion of the assembly, and rests on the shoulder of part 20 and on the screw ring 29.

The elastomers used are of the same type as those used for the construction process described in FIG. 1.

While specific embodiments of the invention have been shown and described to illustrate the application of the principles of the invention, it will be understood that the invention may be embodied otherwise without departing from said principles.

What we claim is:

1. A device for suspending a measuring instrument housing inside a drilling assembly, said device comprising:
    a drill-collar;
    at least one connecting member attached to said measuring instrument housing and concentric with but radially spaced from a part of said drill-collar;
    annular elastomeric suspension means positioned between said connecting member and said part of said drill-collar to damp the transmission of torsional and longitudinal vibrations from said collar to said connecting member;
    a first seat on said connecting member;
    a second seat on said drill-collar axially spaced from said first seat, and
    an annular member gripped between said seats and made of an elastomeric material having a greater rigidity than that used to make said suspension means.

2. Device as claimed in claim 1 in which said suspension means comprises a plurality of rings, each comprising an internal frame section, a concentric external frame section, and an elastomeric body section positioned between said frame sections and vulcanized thereto, one of said frame sections being fixed to said drill-collar part and the other to said connecting member.

3. A device according to claim 2 in which the suspension rings are provided with grooves that are parallel to the center-line of the rings.

4. A device according to claim 1 in which said elastomer is of the nitrile acrylic type.

5. A device according to claim 1 in which said elastomer is of the fluorinated type.

6. A device as claimed in claim 1 in which said drill-collar has two seals and comprising two connecting members attached to opposite ends of said instrument housing, each of which connecting members is connected to said drill-collar by a plurality of suspension rings and provided with a seat, said device further comprising a second annular member made of an elastomeric material having a greater rigidity than that used to make said suspension means, each of said annular members being positioned between one of said drill-collar seats and one of said connecting member seats.

7. Device as claimed in claim 1 in which said drill-collar part is a central axial projection connected to the remainder of said collar by a perforate web, and said connecting member defines a recess encircling said projection.

8. Device as claimed in claim 1 comprising elastomeric centering means attached to said instrument housing and projecting radially thereof.

9. Device as claimed in claim 1 in which the elastomeric sections of said rings are provided with a plurality of recesses which assist in determining the rigidity of said rings.

10. Device as claimed in claim 1 in which said seats overlap.

* * * * *